United States Patent [19]
Tenkumo et al.

[11] 3,715,964
[45] Feb. 13, 1973

[54] LENS SHUTTER CONTROL MECHANISM FOR A SINGLE LENS REFLEX CAMERA

[75] Inventors: Shohei Tenkumo, Saka-shi, Osaka-fu; Takeshi Egawa, Kainan-shi, Wakayama-ken, both of Japan

[73] Assignee: Minolta Camera Kabushiki Kaisha, Miname-ku, Osaka, Japan

[22] Filed: Sept. 17, 1970

[21] Appl. No.: 73,134

[30] Foreign Application Priority Data

Sept. 17, 1969 Japan .................................. 44/73230

[52] U.S. Cl. ..................................... 95/42, 95/53 E
[51] Int. Cl. ............................................. G03b 19/12
[58] Field of Search ................................ 95/42, 53 E

[56] References Cited
UNITED STATES PATENTS

3,487,759   1/1970   Fahlenberg .............................. 95/42

Primary Examiner—Samuel S. Matthews
Assistant Examiner—E. M. Bero
Attorney—Watson, Cole, Grindle & Watson

[57] ABSTRACT

A lens shutter control mechanism includes an operating member movable between a first and second cocked position in accordance with the actuation of an electromagnetic means whereby a shutter blade member is respectively opened and closed with said operating member respectively in said first and second cocked position. A latch member actuated by the electromagnetic means retains the operating member in the second cocked position. The actuation of the electromagnetic means is determined by the operation of two switches which are operated in accordance with the movement of a mirror between a viewing position and a picture taking position.

3 Claims, 2 Drawing Figures

3,715,964

LENS SHUTTER CONTROL MECHANISM FOR A SINGLE LENS REFLEX CAMERA

BACKGROUND OF THE INVENTION

The present invention relates to a shutter control mechanism for a single lens reflex camera, and more particularly relates to a control mechanism for controlling sequential operation of a lens shutter, a mirror, and a light shield member in a single lens reflex camera.

A single lens reflex camera has the advantage of effecting the image adjustment and the adjustment of the focus prior to photographing with the same picture image as that projected on the film face by reflecting the image light ray incident from an objective lens by means of a reflector. Additionally in such a single lens reflex camera, in order to prevent light leakage onto the film a light shield member is used while the objective lens is exchanged. In this case, for the light shield member the focal plane shutter is very often used for which the light shield member itself is able to control the exposure time when a lens system having no lens shutter is attached to the camera. However, the focal plane shutter has the disadvantages that the exposure time required for synchronization with an electronic flash is restricted and distortion of the image results when photographing an object moving at high speed.

Therefore, it is desirable to eliminate the focal plane shutter and enable a lens shutter to be used when photographing such an object as described above.

On the other hand, in a single lens reflex camera, when a lens shutter is used it is necessary to retain the blades for lens shutter in an open position during the aforementioned adjustments. Such retention of the blade open position is necessary also in the case of exposure adjusting in a camera having a photoelectric receiving light through an objective lens. Therefore, in order to prevent light leakage it is necessary to provide a separate light intercepting member in front of the film in the camera body. The light intercepting member can be formed by the screens of a focal plane shutter.

And, between the light intercepting member and the lens shutter the following interlock operations are necessary to be effected:

a. In order to effect the adjustments of a focus and an image, the open position of the shutter blades and light blocking position of the light shield must be retained.

b. The release operation for preparing exposure of the film.

c. The movement of the blades to a closed position for the lens shutter.

d. The screening release movement of the light shield from a light blocking position to an open position for taking a picture through the lens shutter.

e. The opening/closing of the blades for exposure.

f. The screening movement of the light shield member from the opening position to the light blocking position.

g. The taking-up of the film and the shutter charge operation.

h. The movement of the blades from the closed position to the opening position.

With the exception of (g) and (h) the aforementioned operations are necessary to be repeated in good order for taking a picture through the lens shutter in the single lens reflex camera. Therefore, it is necessary to provide an interlocking mechanism or a means for issuing and receiving signals between the light shield member and the lens shutter for starting the subsequent operation in connection with the completion of each of the aforementioned operations.

SUMMARY OF THE INVENTION

The primary object of the present invention is to provide a single lens reflex camera having an electric control device, which effects the screening release operation of the light shield member of the camera body after completion of the movement of the blade members from an open position to a closed position of the lens shutter which does not allow the opening/closing operation for exposure of the blade members in the lens shutter until the screening release operation of the light shield member is completed.

Another object of the present invention is to use the light shield member as a screen for the focal plane shutter provided.

Other objects of the present invention will be cleared from the detailed description disclosed hereinafter.

DESCRIPTION OF THE PREFERRED EMBODIMENT

Figure 1:
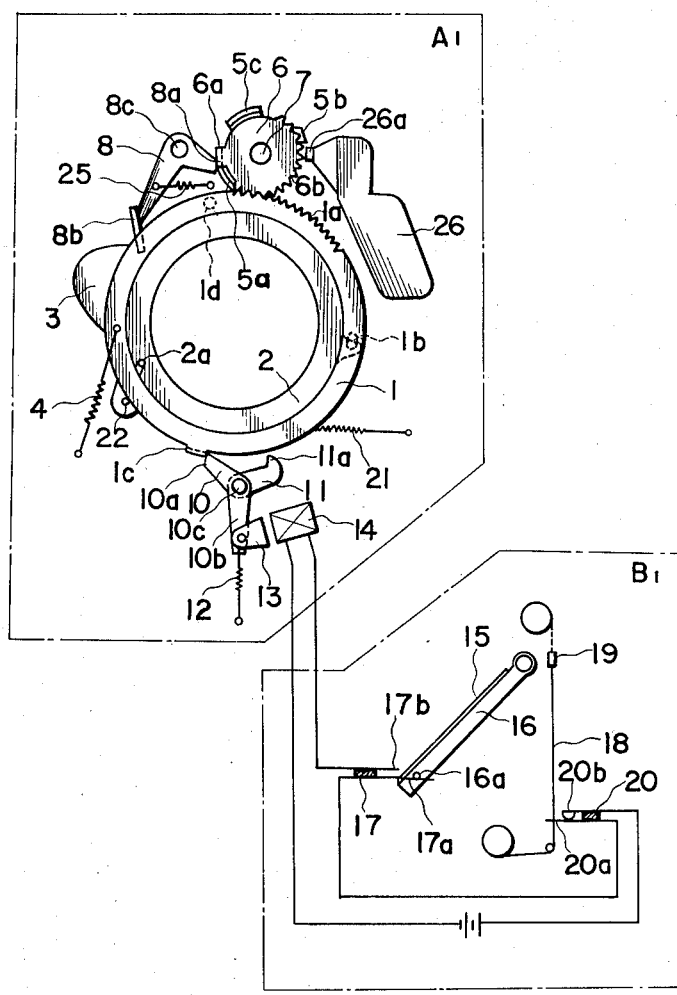
FIG. 1 is a combined front plan showing view the construction of the lens shutter and the construction as seen from the side of the camera body, in an embodiment in accordance with the present invention.
Figure 2:
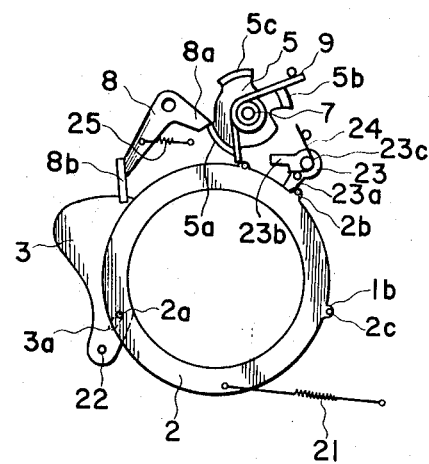
FIG. 2 is a front view showing the sector ring by removing the charge ring of the lens shutter and the shutter driving mechanism in the embodiment shown in FIG. 1.

With reference to the drawings, both FIG. 1 and FIG. 2 show the position of the elements after completion of the shutter charge and after an initial movement of the reflector from a viewing position to a picture taking position. In lens shutter $A_1$, charge ring 1 as an operating member is mounted on the lens barrel not shown in the drawings and is urged counter-clockwise by driving spring 4. And, on the periphery of charge ring 1 there is provided gear tooth portion 1a which meshes with set gear 6, riser 1C rising outwardly on the opposite side of the gear tooth portion 1a, and crescent pin 1b and release pin 1d projecting from the back side of charge ring 1.

On the back side of the charge ring 1, sector ring 2 is mounted rotatably and coaxially on the lens barrel, and urged counter-clockwise by return with ring spring 21. Working pin 2a projecting from the back side of sector ring 1 is fitted in slot 3a provided on blade 3 pivoted on the lens barrel by pin 22, so as to open blade 3 through the clockwise rotation of sector ring 2 and close blade 3 through the counterclockwise return motion of sector ring 2. And, on the periphery of sector ring 2 there are provided risers 2b and 2c, riser 2c facing the turning path of crescent pin 1b mounted on charge ring 1. And, riser 2b engages driving arm 23a of sector opening/closing lever 23.

On set gear 6 working piece 6a which is bent back is formed for engaging with projection 5a of set ring 5 pivoted rotatably by the same pin 7 as set gear 6. Set ring 5 is has clockwise turning tendency by main driving spring 9, and in addition to projection 5a, provided with arm portion 5b projecting outwardly and speed adjusting projection 5c formed into an arc shape.

Restraining lever 8 pivoted by pin 8c is given the counter-clockwise turning tendency by spring 25, and one arm thereof, namely, restraining arm 8a slides in contact with projection 5a, and when projection 5a is rotated counter-clockwise against main driving spring 9 restraining arm 8a contacts with the rear end of projection 5a and slope portion 8b of the other arm thereof faces the turning track of release pin 1d on the back side of charge ring 1.

Speed adjusting projection 5c comes into contact with working arm 26a of well known retarding mechanism, namely, a governor, when set ring 5 is rotated clockwise by main driving spring 9, speed adjusting projection 5c drives governor 26 through working arm 26a thereof and the rotating speed of set ring 5 is adjusted corresponding to the set retarding lapse of governor 26.

Sector opening/closing lever 23 connected to pin 23c has a counter-clockwise turning tendency by weak spring 24 so that driving arm 23a thereof is always in contact with riser 2c of sector ring 2 as described above, and the other arm thereof, namely, driven arm 23b faces the turning track of arm portion 5b of set ring 5.

On sector closing lever 10 pivoted rotatably by pin 10c there is formed check pawl 10a for engaging with riser 1c of charge ring 1, and the other arm 10b has armature 13 thereon facing electromagnet 14 and is pulled by spring 12. And, another release lever 11 is connected to pin 10c in a body with said sector closing lever 10, and on the tip of release lever 11 restraining pawl 11a is formed. And, when electromagnet 14 is demagnetized arm 10b of sector closing lever 10 is pulled by spring 12 armature 13 maintains a clearance with electromagnet 14, check pawl 10a is located in a position engage riser 1c, and restraining pawl 11a retreats out of the turning track of riser 1c. And, when electromagnet 14 is excited to attract armature 13 levers 10, 11 rotate counter-clockwise, and check pawl 10a retreats from engagement with riser 1c, and restraining pawl 11a comes into the turning track of riser 1c.

Electromagnet 14 is operated by two switches 17, 20 provided in the camera body. That is, the power source, first switch 17, second switch 20, and electromagnet 14 form a series circuit and when both switches 17, 20 are closed electromagnet 14 is excited.

Movable frame 16 having mirror 15 thereon is swingably pivoted in interlocking with the shutter release operation from a viewing position to a picture taking position. Pin 16a projected on one end portion of the frame 16 is engageable with movable contact 17a of the first switch 17 which is normally closed. When reflector 15 with frame 16 is in the viewing position, pin 16a engages with movable contact 17a to disengage movable contact 17a from fixed contact 17b for opening switch 17, and when movable frame 16 is rotated slightly to picture taking position by the release operation, switch 17 is closed. Further, second switch 20 which having the closing tendency light shield member is opened when light shield member 18 terminates the releasing from the screening position thereof by rim 19 coming into contact with movable contact 20a of second switch 20 to disengage it from fixed contact 20b of second switch 20. Therefore, when light shield member 18 is in the screening position of the film, second switch 20 is closed.

Additionally, in this embodiment the opening/closing operation of the first switch is effected by the movable frame of the reflector, however, this is not always necessary, and it is sufficient that it only be a member of an intermediate mechanism for moving reflector 15 from the viewing position to the picture taking position in accordance with the operation at the first stage of release. For example, it is possible to select either a release rod or an interlocking member for turning a reflector, or it is also possible to make use of a member for stopping down a diaphragm to the preset position. Further, light shield member 18 can be substituted by an opening screen of the prior art focal plane shutter. In this case the closing screen of the focal plane shutter must be closed after the closing of the lens shutter is terminated and accordingly it is necessary to establish such an operation to set the focal plane shutter for a bulb or a long time exposure.

Since the present invention is formed as described above, by rotating charge ring 1 manually to its fullest extent, until the termination of the manual rotation of charge ring 1, the screening of light shield member 18 for the film (or the screening of the film by the opening screen in the focal plane shutter) is manually terminated. Therefore, first switch 17 is opened so that electromagnet 14 is demagnetized and check pawl 10a of sector closing lever 10 engages riser 1c to check charge ring 1 against driving spring 4, and accordingly the lens shutter is preopened.

Set gear 6 which is meshed with gear tooth portion 1a when charge ring 1 is rotated as described above is rotated counter-clockwise and working piece 6a thereof engages with projection 5a of set ring 5, and accordingly set ring 5 is rotated in the same direction to energize main driving spring 9 and near the terminal thereof projection 5a engages with restraining arm 8a. In this case, crescent pin 1b mounted on charge ring 1 engages with riser 2c of sector ring 2, and with the progress of clockwise rotation of charge ring 1 it rotates sector ring 2 clockwise while energizing return spring 21 so that working pin 2a thereof rotates blade 3 to open it. And thus, the position of the elements for a charged shutter as shown in FIG. 1 and FIG. 2 is attained. And, the light ray incident from blade 3 is reflected to the finder by reflector 15 and the focussing of an image is adjustable.

Next, in photographing, upon carrying out the release operation the turning motion of movable frame 16 of reflector 15 is interlocked with the shutter button on account of the operation during the first stage of release and pin 16a thereof disengages from movable contact 17a, so that movable contact 17a comes into contact with fixed contact 17b through its elastic tendency and first switch 17 is closed. At this juncture the light shield member is held in its screening position and accordingly second switch 20 also is closed, so that the circuit for electromagnet 14 is closed and electromagnet 14 is excited to attract armature 13. Sector closing lever 10 is rotated counter-clockwise against spring 12 and check pawl 10a disengages from riser 1c of charge ring 1, so that charge ring 1 rotates counter-clockwise through driving spring 4 and riser 1c is restrained by restraining pawl 11a of release lever 11 in the turning position and stopped.

With the progress of rotation of charge ring 1, sector ring 2 pressed by crescent pin 1b is also rotated counter-clockwise by return spring 21 and working pin 2a thereof rotates blade 3 in the closing direction, and accordingly the blade is closed once and the preopening of the lens shutter is terminated (or closed).

At the same time, riser 2b of sector ring 2 rotates sector opening/closing lever 23 clockwise to allow driven arm 23b thereof to come into the turning track of arm portion 5b of set ring 5.

Successively, by means of the well known release mechanism, light shield member 18 (the opening screen of the focal plane shutter) starts to retreat from the film front face, and when the film face is perfectly exposed rim 19 thereof comes into contact with movable contact 20a of second switch 20 and disconnects it from fixed contact 20b, and second switch 20 is opened so that electromagnet 14 is demagnetized.

Thereupon, release lever 11 is rotated clockwise by spring 12 and restraining pawl 11a thereof disengages from riser 1c, and charge ring 1 furthers again the counter-clockwise rotation and at last release pin 1d thereof comes into contact with slope portion 8b of restraining lever 8 to rotate restraining lever 8 clockwise, so that restraining arm 8a thereof disengages from projection 5a, and set ring 5 is rotated clockwise by main driving spring 9. In the course of rotation thereof arm portion 5b presses driven arm 23b of sector opening/closing lever 23. And, while driven arm 23b is being pressed driving arm 23a rotates sector ring 2 clockwise and meanwhile blade 3 is opened instantly.

The movement of blades to closing position is retained momentarily by set ring 5 and speed governor 26 for adjusting exposure time for the set shutter speed by governor 26.

We claim:

1. A lens shutter control mechanism for a single lens reflex camera having a lens shutter, comprising:
    a mirror movable between a viewing position and a picture taking position;
    a light shield movable between a first position for blocking light to a film and a second position where light is passed to the film;
    a first switch;
    a second switch closed with said light shield in said first position;
    an electric power source;
    means for opening said first switch with said mirror in said viewing position and for closing said first switch with the initiation of movement of said mirror from said viewing position to said picture taking position;
    means for opening said second switch at the termination of movement of said light shield to said second position;
    a lens shutter including shutter blade members movable between a blade opened position and a blade closed position;
    a control means for controlling said shutter blade members to establish a time film exposure interval;
    an operating member movable between a first cocked position for retaining said shutter blade members in said blade opened position and a second cocked position for allowing said shutter blade members to be in said blade closed position, and further movable to a position for actuating said control means,
    a latch member for retaining said operating member in said second cocked position, and
    an electromagnetic means serially connected to said first and second switches for releasing said operating member from said first cocked position and simultaneously moving said latch member to engage with said operating member with said first switch closed, and releasing said operating member from said second cocked position to allow movement thereof to said position for actuating said control means with said second switch opened.

2. A lens shutter control mechanism as set forth in claim 1, wherein said second switch is opened with said light shield fully opened in said second position.

3. A lens shutter control mechanism as set forth in claim 1, wherein said latch member includes a lever having a latch portion for retaining said operating member in said first cocked position, said lever being biased by a spring to effect said retention, and
    an armature mounted on said lever for moving said lever against said spring bias and releasing said operating member.

* * * * *